US007056012B2

(12) United States Patent
Blakeley, III

(10) Patent No.: US 7,056,012 B2
(45) Date of Patent: Jun. 6, 2006

(54) MULTIMETER WITH NON-CONTACT TEMPERATURE MEASUREMENT

(75) Inventor: Gerald W. Blakeley, III, Lincoln, MA (US)

(73) Assignee: Extech Instruments Corporation, Waltham, MA (US)

( * ) Notice: Subject to any disclaimer, the term of this patent is extended or adjusted under 35 U.S.C. 154(b) by 0 days.

(21) Appl. No.: 10/654,851

(22) Filed: Sep. 4, 2003

(65) Prior Publication Data

US 2004/0066833 A1 Apr. 8, 2004

Related U.S. Application Data

(60) Provisional application No. 60/415,909, filed on Oct. 3, 2002.

(51) Int. Cl.
*G01K 1/16* (2006.01)

(52) U.S. Cl. ...................... 374/120; 374/121; 374/128; 374/130

(58) Field of Classification Search ........ 374/120–121, 374/128, 130, 142, 208
See application file for complete search history.

(56) References Cited

U.S. PATENT DOCUMENTS 4,045,670 A * 8/1977 Anderson et al. ........... 374/129
4,087,689 A * 5/1978 Asawa ....................... 250/342
4,315,150 A * 2/1982 Darringer et al. ........... 374/130
4,634,294 A * 1/1987 Christol et al. ............. 374/130
4,743,122 A * 5/1988 Yamano et al. ............. 374/208
4,773,766 A * 9/1988 Nagasaka et al. ........... 374/124
4,896,281 A * 1/1990 Mack ......................... 374/121
4,986,672 A * 1/1991 Beynon ...................... 374/130
5,011,296 A * 4/1991 Bartosiak et al. ........... 374/131
RE34,507 E * 1/1994 Egawa et al. .............. 374/126
5,352,039 A * 10/1994 Barral et al. ................ 374/121
5,460,451 A * 10/1995 Wadman ..................... 374/126
5,626,424 A * 5/1997 Litvin et al. ................ 374/121
5,836,694 A * 11/1998 Nguyen ...................... 374/130
5,860,740 A * 1/1999 Fujima ....................... 374/126
6,095,682 A * 8/2000 Hollander et al. .......... 374/121
6,234,669 B1 * 5/2001 Kienitz et al. .............. 374/130
6,267,500 B1 * 7/2001 Hollander et al. .......... 374/121
6,280,082 B1 * 8/2001 Aoyama et al. ............ 374/121

OTHER PUBLICATIONS

Michalski et al., Temperature Measurement, published by Wiley and Sons, pp. 152-180, (1991).*
“Mini Infrared Thermometer”, Davis Instruments Catalog, vol. 59, p. 255 (no month, 1993?, received at USPTO prior to 2000).*
“Portable Infrared Thermometer”, Davis Instruments Catalog, vol. 59, pp. 256-257 (no month, 1993?, received at USPTO prior to 2000).*

* cited by examiner

*Primary Examiner*—Yaritza Guadalupe
(74) *Attorney, Agent, or Firm*—Brian M. Dingman; Mirick, O’Connell, DeMallie & Lougee

(57) ABSTRACT

A multimeter with non-contact temperature measurement capability. The multimeter is contained in a housing, and has outputs relating to measured electrical parameters. There is also an output display contained in the housing, for displaying results to a user. A non-contact optically-based temperature sensing device is coupled to the housing, and has an output related to sensed temperature. Circuitry contained in the housing processes both the multimeter outputs and the temperature sensing device output, and transmits the processed output to the output display.

18 Claims, 6 Drawing Sheets

11a
12a
1000
2
4
5
7
3
1
6

MULTIMETER WITH NON-CONTACT TEMPERATURE MEASUREMENT

CROSS REFERENCE TO RELATED APPLICATION

This application claims priority of Provisional application Ser. No. 60/415,909, filed on Oct. 3, 2002.

FIELD OF THE INVENTION

This invention relates to an infrared (IR) temperature measurement device combined into a Digital Multimeter (DMM) that is typically used for measuring electrical parameters.

BACKGROUND OF THE INVENTION

There are many situations in which technicians and others need to accomplish both non-contact temperature measurement along with measurement of electrical parameters. Multimeters are typically used to measure electrical parameters including (but not necessarily limited to) voltage, current and resistance. Present practices require the use of two different instruments, typically a multimeter and a thermometer or pyrometer, to perform both multimeter and temperature measurement tasks.

SUMMARY OF THE INVENTION

It is therefore an object of this invention to provide an instrument that can be used to measure both electrical parameters and temperature. Many of the functions of these measurements, such as the display, power supply, housing, and analog to digital converter, can be common to both the multimeter functionality and the temperature measurement functionality. With the invention, portability is improved by only having to carry one instrument for use in the field. To further simplify use for quick field measurements, in a preferred embodiment there is no confusing emissivity adjustment that has to be set for the temperature measurement function.

This invention features a multimeter with non-contact temperature measurement capability. The multimeter is contained in a housing, and has outputs relating to measured electrical parameters. There is also an output display contained in the housing, for displaying results to a user. A non-contact optically-based temperature sensing device is coupled to the housing, and has an output related to sensed temperature. Circuitry contained in the housing processes both the multimeter outputs and the temperature sensing device output, and transmits the processed output to the output display.

The multimeter is preferably a digital multimeter. The temperature sensing device preferably comprises an infrared sensor. The temperature sensing device may further comprise a lens, proximate the infrared sensor, for focusing entering radiation and protecting the infrared sensor. The temperature sensing device may define a sense axis that is fixed relative to the housing, or adjustable relative to the housing. When adjustable, the temperature sensing device may be mounted in a mount that is coupled to and movable relative to the housing (for example rotatable), to allow the user to aim the temperature sensing device.

The multimeter with non-contact temperature measurement capability may further comprise an optical aiming device coupled to the housing, to assist the user in aiming the temperature sensing device at an object whose temperature is to be measured. The optical aiming device may defines an aiming axis that is adjustable relative to the housing, which may be accomplished with the optical aiming device mounted in a mount that is coupled to and movable relative to the housing (e.g., rotatable), to allow the user to aim the optical aiming device. The optical aiming device preferably comprises a diode laser device.

The multimeter may further comprise a switch for switching at least some of the circuitry between the multimeter outputs and the temperature sensing device output. The multimeter may also include a user-operable electrical device for selectively routing the temperature sensing device output to the circuitry, or for selectively holding the sensed temperature. The circuitry preferably determines the sensed temperature based on the output of the temperature sensing device using a fixed emissivity, which may be less than one.

BRIEF DESCRIPTION OF THE DRAWINGS

Other objects, features and advantages will occur to those skilled in the art from the following description of the preferred embodiments, and the accompanying drawings, in which.

DESCRIPTION OF THE PREFERRED EMBODIMENTS OF THE INVENTION

In the invention, the common functions required for processing of signals from an infrared (IR) temperature sensor with fixed emissivity, and those of a digital multimeter (DMM), are accomplished by common circuitry, and a common display and other parts as described above. The DMM housing can be designed to include the IR sensing element, and an optional laser aiming device.

Figure 1:
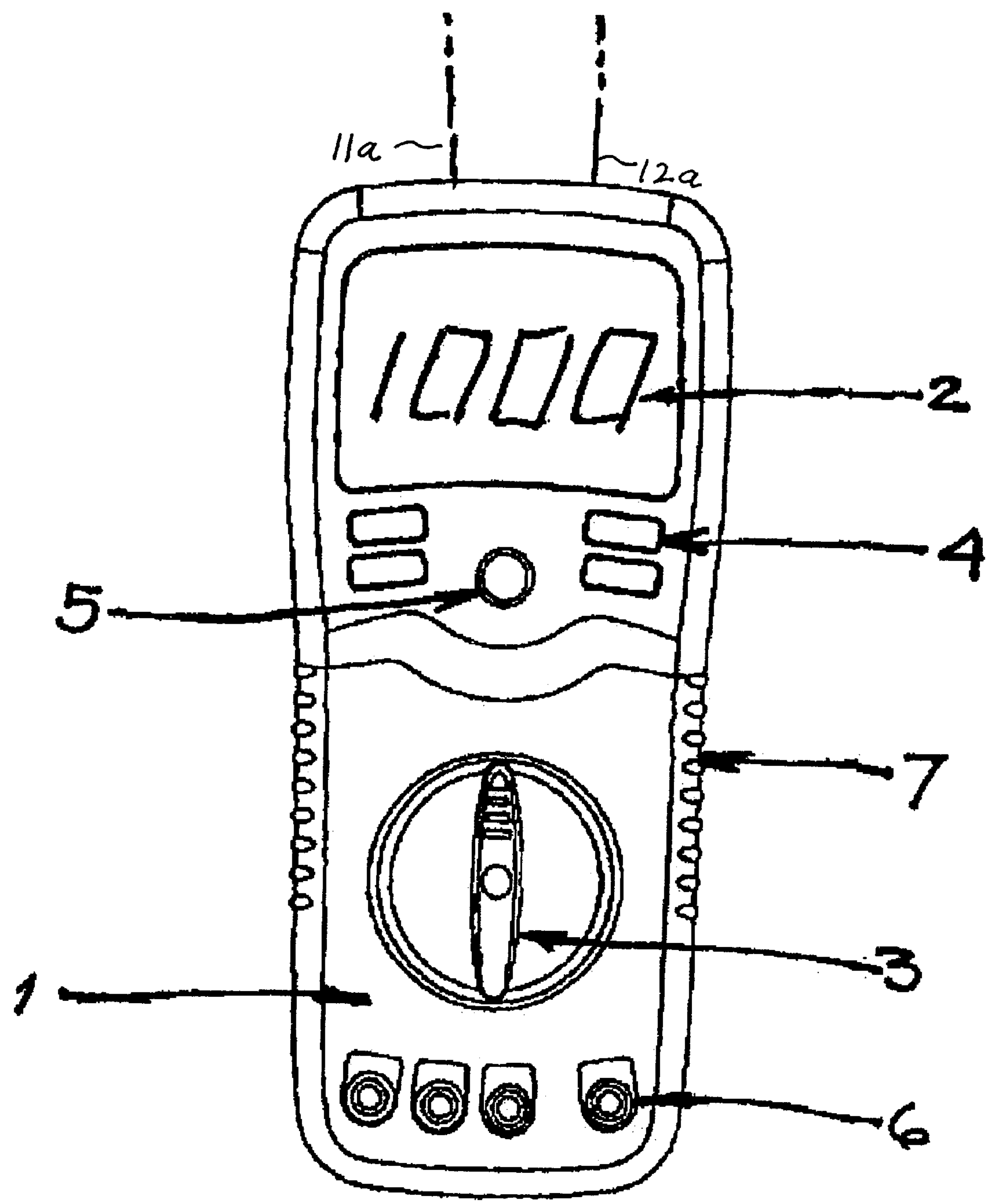
FIG. 1 is a top view of a preferred embodiment of the multimeter with non-contact temperature measurement according to this invention.
Figure 2:
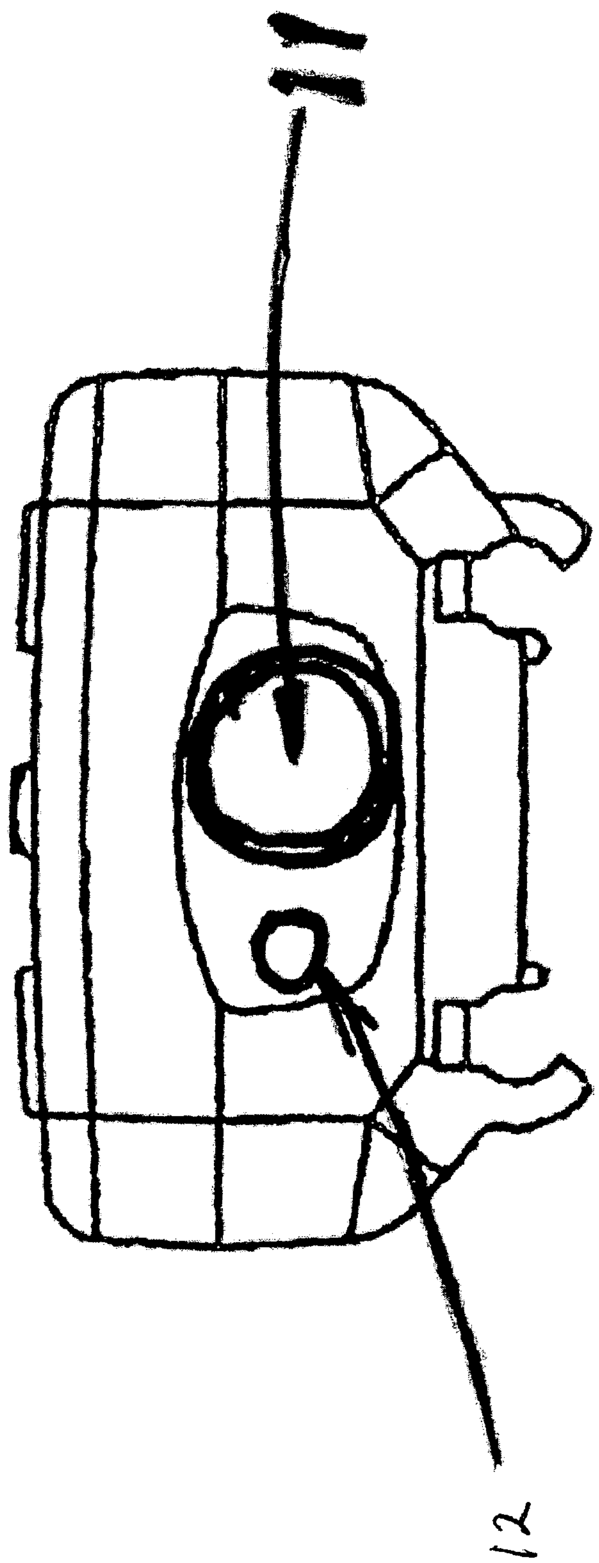
FIG. 2 is an end view of the device of FIG. 1.

A typical mechanical arrangement of the invention is shown in FIGS. 1 & 2. FIG. 1 is a top view of a typical arrangement consisting of a housing or case 1 that contains the circuitry in a convenient hand-held unit, with a digital display 2 for reading the values being measured. Switch 3 allows the user to select one of a multiplicity of functions with a multiplicity of ranges. Pushbuttons 4 perform further selection of parameters or functions in combination with rotary switch 3. Other embodiments may use these pushbuttons and switches in combination, or alone, to achieve the same result. In addition (and not shown in the drawings) slide switches and/or keypads may also be used. Two or more input jacks 6 are used together with test leads (not shown) to input the multimeter input signals.

FIG. 2 is an end view that shows one arrangement of the infrared (IR) detector 11, used to measure the temperature of a surface or body without actual contact. It accomplishes this by detecting the IR emissions given off by the object whose temperature is being measured. At a specific temperature, the IR emissions from any object vary with its surface conditions, such as finish and color. This variation is a factor called emissivity. Each type of surface has an emissivity ranging from zero to one. The emissivity of a matte black body is one. The emissivity of this embodiment is fixed, preferably at 0.95, although other emissivities could also be used. Most objects typically being measured have an emissivity reasonably close to 0.95. The result is a practical apparatus which is easy to use without having to be concerned with adjusting the emissivity, or it being misadjusted. FIG. 2 also shows an aperture 12 through which a laser beam or another IR sensor aiming beam may be shone (typically from a laser diode) to assist in aiming the temperature measurement apparatus at the surface being measured.

Figure 3:
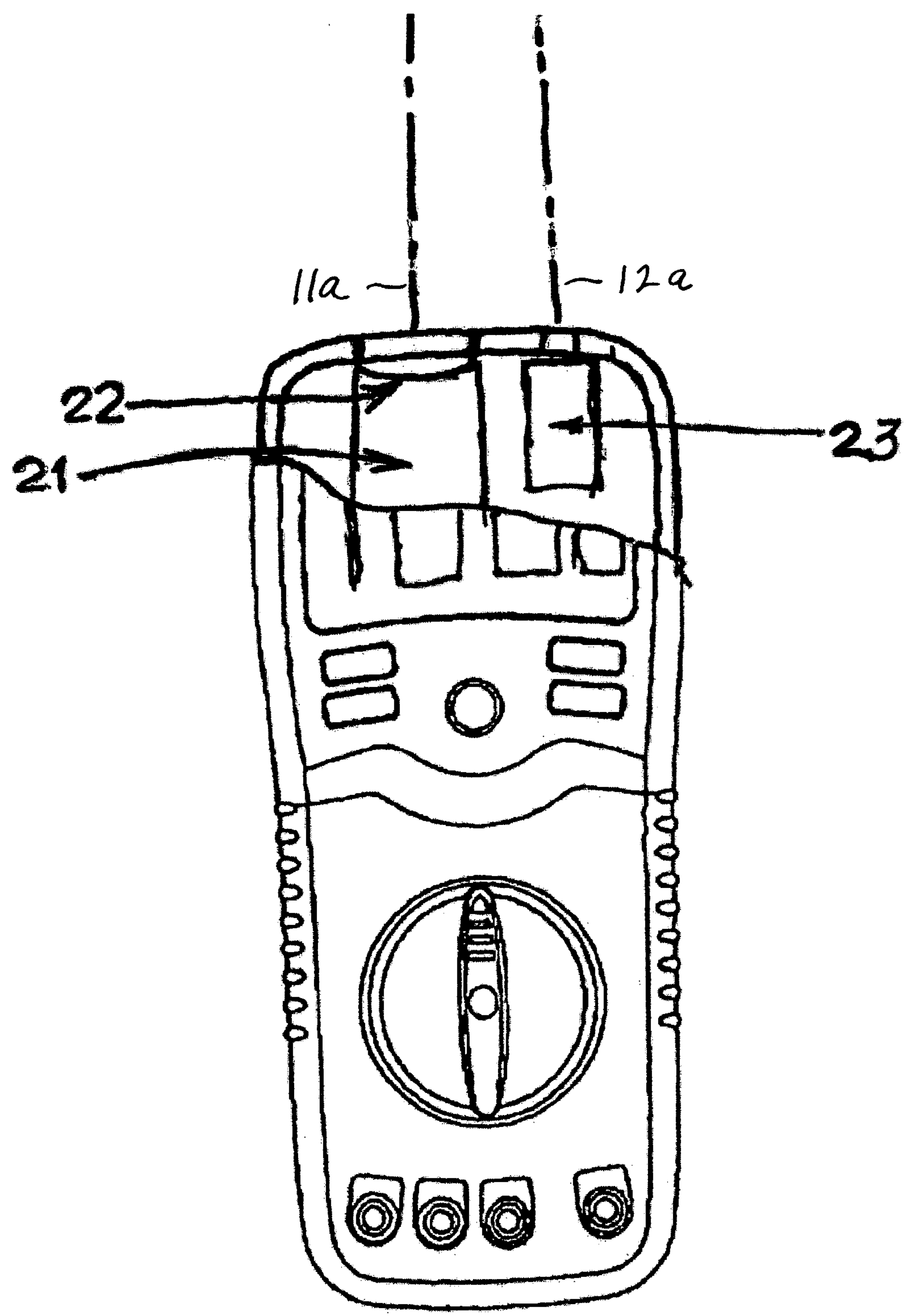
FIG. 3 is a partial cross-sectional view similar to that of FIG. 1.

IR detector 11 sense axis 11*a* and laser diode beam sense axis 12*a*, FIG. 3, are normally fixed at a slight angle to each other to reduce parallax at the surface being measured. Switch 5 can be used to turn on the laser aiming device and to accept the reading from the IR detector as opposed to the multimeter inputs. In other embodiments, this switch may also be used to control the IR temperature readout, such as holding the temperature reading while the switch is engaged. Other types of switches and locations may be used. Since the temperature sensor must be pointed at the surface being measures, the display may not be easily viewable by the user while the temperature is being sensed. Thus, it may be desirable that the IR reading be taken and then held for easy reading later, while the temperature sensor is pointed away from the surface.

Figure 4:
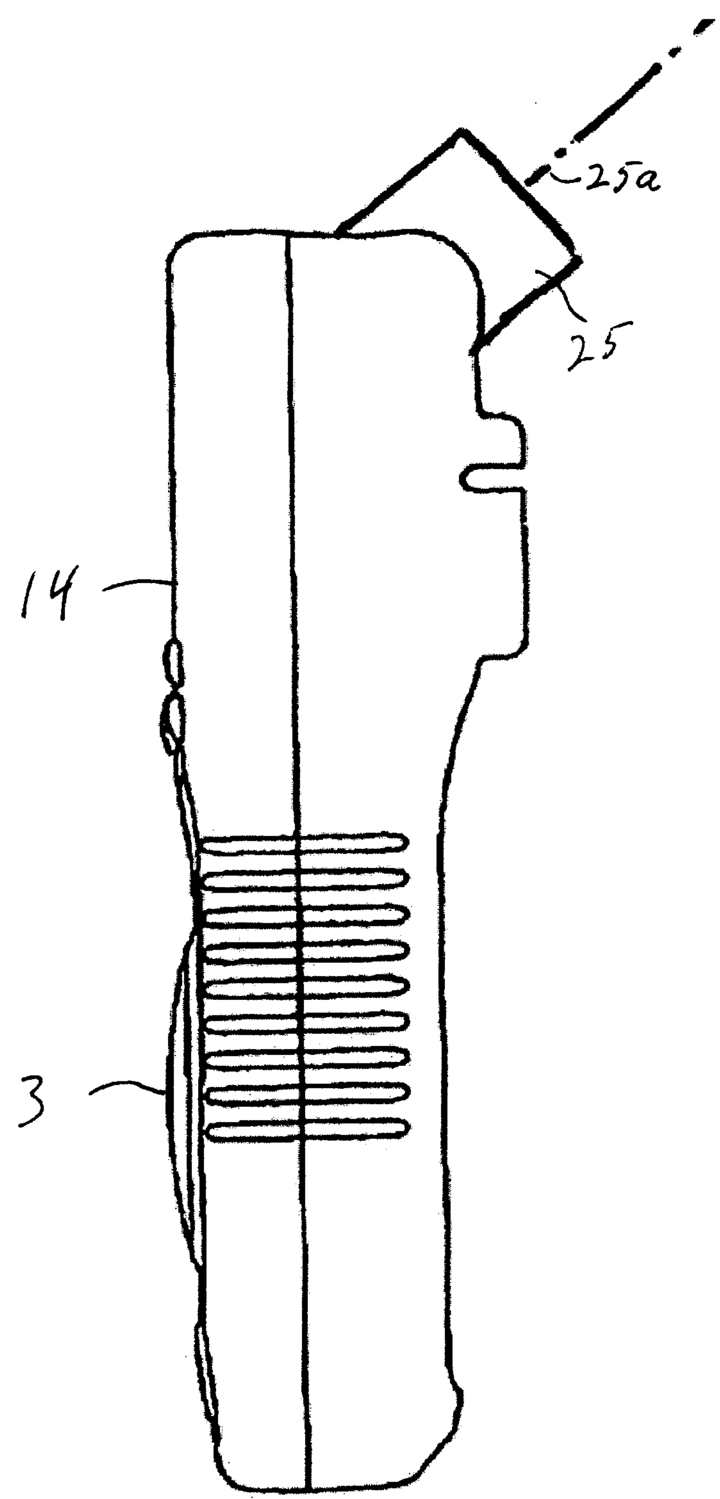
FIG. 4 is a side view of an alternative embodiment to that depicted in FIGS. 1–3, in which the temperature sensing takes place along a different axis.
Figure 5:
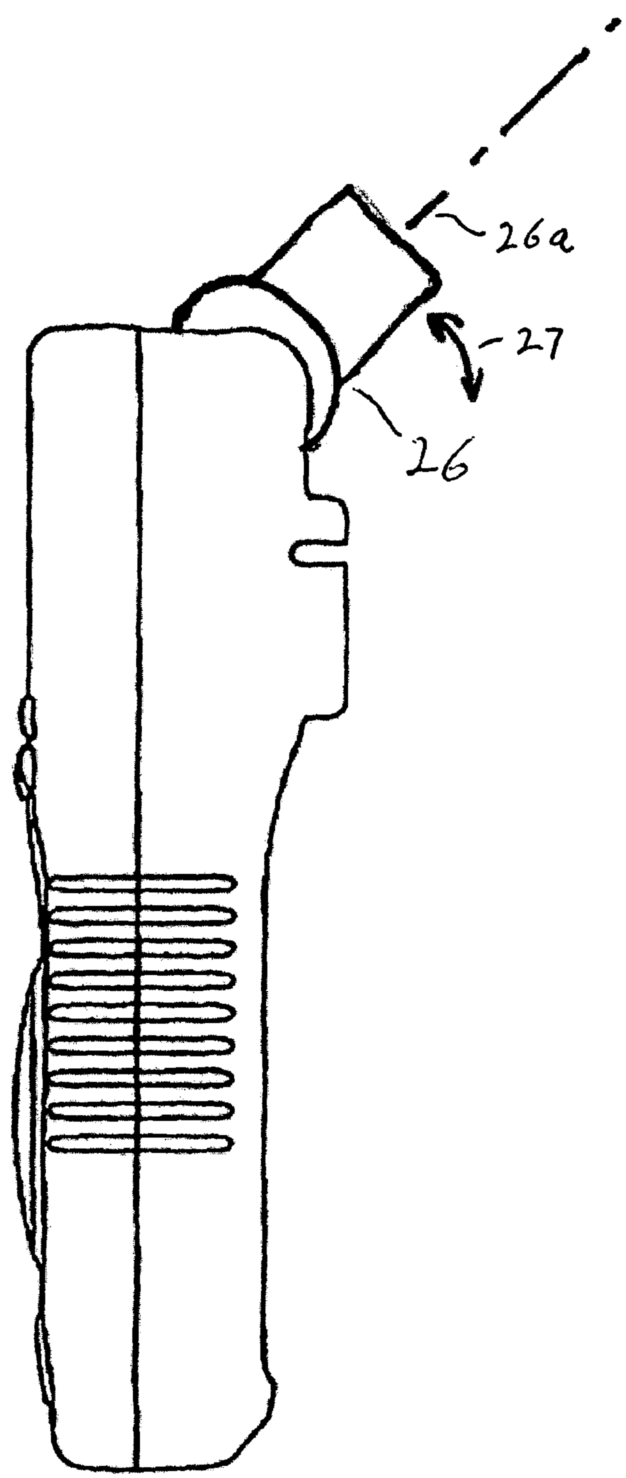
FIG. 5 is a view similar to that of FIG. 4 but for another alternative embodiment with a user-adjustable temperature sensing axis.

FIG. 3 is a partial cross-sectional view from the top of a typical arrangement of the IR detector, 21, and the aiming laser, 23. The IR detector 21 may be focused, filtered and protected by a lens, 22. Other embodiments may have the IR detector and aiming laser mounted at a more convenient angle as shown by combination 25 having sense axis 25*a* in the side view of FIG. 4. These may also be mounted on a movable (for example rotatable gimbaled) mount 26 with sense axis 26*a*. Mount 26 can move in a uniaxial or multiaxial direction as represented by arrow 27, FIG. 5, in order to allow the user to vary the temperature measurement axis.

There may also be included with any of the above a protective covering, holster, or boot 7, FIG. 1, preferably made of a softer material to protect against mechanical damage and provide a better hand gripping surface.

Figure 6:
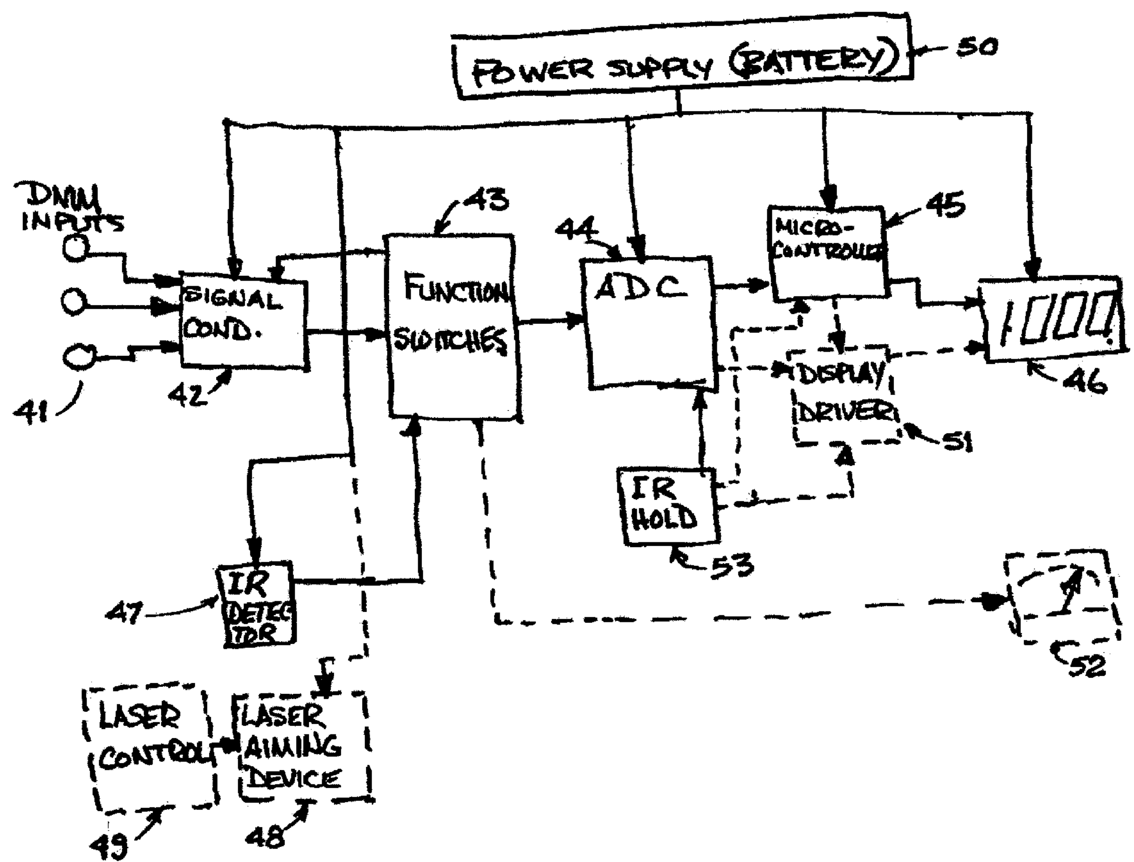
FIG. 6 is a schematic diagram of the circuit functions for the preferred embodiment of this invention.

FIG. 6 is a diagram of the circuit functions of the preferred embodiment, and shows the commonality of the devices shared by both the DMM function and the IR measuring function. Input jacks 41 are used to input the DMM signals being measured. The input signals are processed by signal conditioning or protection circuits 42, which are then selected by the function switch 43 for presentation to the analog to digital converter (ADC) 44. The function switch 43 may also control the switching of attenuators, gain or other means to convert the measured signal to a more useful one, and to provide protection where needed in the signal conditioning circuits. In alternate embodiments, the signal conditioning function may be after the function switches, or divided in front of and between the function switches and the ADC. The output from the ADC may go directly to the display drivers 51, which may also be part of the ADC devices, or to a microcontroller circuit 45. The microcontroller circuit 45 may also contain the ADC and/or display drivers. The digital displays 46 are driven directly from the microcontroller or the display drivers.

The IR detector circuit 47 is also switched to the ADC by the function switches, similar to the DMM input signals. The power supply 50, which usually consists of one or multiple batteries and regulating devices, provides power and reference signals as required to all of the functions described above. Other embodiments may provide a laser aiming device 48 and its control circuit 49, an IR hold circuit 53 which will hold the measured reading on the display, or may also use an analog display 52 which would not require the use of an ADC or other digital circuits.

Although specific features of the invention are shown in some drawings and not others, this is not a limitation of the invention, as the different features can be combined differently to accomplish the invention. Other embodiments will occur to those skilled in the art and are within the following claims.

What is claimed is:

1. A multimeter with non-contact temperature measurement capability, comprising:

a multimeter contained in a housing and having outputs relating to measured electrical parameters;

an output display contained in the housing, for displaying results to a user;

a non-contact optically-based temperature sensing device comprising an infrared sensor built in to the housing, having an output related to sensed temperature of a surface, and without the capability of adjusting for emissivity of the surface being sensed, the temperature sensing device defining a sense axis that is adjustable relative to the housing, and further comprising a lens, proximate the infrared sensor and mounted in a mount that is coupled to and projects outwardly from the housing, for focusing entering radiation and protecting the infrared sensor, wherein the mount is movable by the user relative to the housing, to allow the user to aim the sense axis; and circuitry contained in the housing for processing both the multimeter outputs and the temperature sensing device output, in which the circuitry determines the sensed temperature based on the output of the temperature sensing device using a fixed emissivity value, the circuitry transmitting the processed output to the output display.

2. The multimeter with non-contact temperature measurement capability of claim 1 in which the mount is rotatably coupled to the housing.

3. The multimeter with non-contact temperature measurement capability of claim 1 further comprising an optical aiming device coupled to the housing, to assist the user in aiming the temperature sensing device at an object whose temperature is to be measured.

4. The multimeter with non-contact temperature measurement capability of claim 3 in which the optical aiming device comprises a laser that is adjustable relative to the housing.

5. The multimeter with non-contact temperature measurement capability of claim 4 in which the optical aiming device is mounted in the mount that is coupled to and projects outwardly from the housing, to allow the user to aim the optical aiming device.

6. The multimeter with non-contact temperature measurement capability of claim 5 in which the mount is rotatably coupled to the housing.

7. The multimeter with non-contact temperature measurement capability of claim 3 in which the optical aiming device comprises a diode laser device.

8. The multimeter with non-contact temperature measurement capability of claim 1 further comprising a switch for switching at least some of the circuitry between the multimeter outputs and the temperature sensing device output.

9. The multimeter with non-contact temperature measurement capability of claim 1 further comprising a user-operable electrical device for selectively routing the temperature sensing device output to the circuitry.

10. The multimeter with non-contact temperature measurement capability of claim 1 further comprising a user-operable electrical device for selectively holding the sensed temperature.

11. The multimeter with non-contact temperature measurement capability of claim 1 in which the fixed emissivity value is about 0.95.

12. A digital multimeter with non-contact temperature measurement capability, comprising:

a digital multimeter contained in a housing and having outputs relating to measured electrical parameters;

a digital output display contained in the housing, for displaying results to a user;

a non-contact infrared temperature sensing device contained within the housing, having an output related to sensed temperature of a surface, and without the capability of adjusting for emissivity of the surface being sensed, the temperature sensing device defining a sense axis that is adjustable relative to the housing and further comprising at least a lens that is mounted in a mount that projects outwardly from the housing, and is coupled to and movable by the user relative to the housing, to allow the user to aim the temperature sensing device sense axis; and circuitry contained in the housing for processing both the multimeter outputs and the temperature sensing device output, in which the circuitry determines the sensed temperature based on the output of the temperature sensing device using a fixed emissivity value, the circuitry transmitting the processed output to the output display.

13. The multimeter with non-contact temperature measurement capability of claim 12 in which the mount is rotatably coupled to the housing.

14. The multimeter with non-contact temperature measurement capability of claim 12 further comprising an optical aiming device coupled to the housing, to assist the user in aiming the temperature sensing device at an object whose temperature is to be measured.

15. The multimeter with non-contact temperature measurement capability of claim 14 in which the optical aiming device comprises a laser that is adjustable relative to the housing.

16. The multimeter with non-contact temperature measurement capability of claim 15 in which the optical aiming device is mounted in the mount that is coupled to and projects outwardly from the housing, to aim the optical aiming device.

17. The multimeter with non-contact temperature measurement capability of claim 16 in which the mount is rotatably coupled to the housing.

18. The multimeter with non-contact temperature measurement capability of claim 12 in which the fixed emissivity value is about 0.95.

* * * * *